United States Patent
Darak et al.

(10) Patent No.: US 10,819,847 B1
(45) Date of Patent: Oct. 27, 2020

(54) SYSTEMS AND METHODS FOR PROTECTING AGAINST OUTGOING CALLS TO MALICIOUS PHONE NUMBERS

(71) Applicant: Symantec Corporation, Mountain View, CA (US)

(72) Inventors: Anand Darak, Pune (IN); Anuradha Joshi, Pune (IN)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 16/135,331

(22) Filed: Sep. 19, 2018

(51) Int. Cl.
*H04M 3/42* (2006.01)
*H04M 1/725* (2006.01)

(52) U.S. Cl.
CPC ... *H04M 3/42102* (2013.01); *H04M 1/72519* (2013.01); *H04M 2203/558* (2013.01)

(58) Field of Classification Search
CPC ......... H04M 3/42102; H04M 1/72519; H04M 2203/558
USPC ....................................... 379/210.02, 210.01
See application file for complete search history.

(56) References Cited

U.S. PATENT DOCUMENTS

| | | | | |
|---|---|---|---|---|
| 6,243,459 B1* | 6/2001 | Cannon | ........... | H04M 1/274583 379/354 |
| 8,503,636 B1* | 8/2013 | McCorkendale | ..... | H04M 15/47 379/133 |
| 8,831,192 B1* | 9/2014 | Clarke | .............. | H04M 3/42042 379/142.06 |
| 9,277,049 B1* | 3/2016 | Danis | ................ | H04M 3/42042 |
| 2003/0048195 A1* | 3/2003 | Trossen | .............. | G07C 9/00111 340/8.1 |
| 2007/0121596 A1* | 5/2007 | Kurapati | ........... | H04L 29/06027 370/356 |
| 2010/0290603 A1* | 11/2010 | Gemayel | ................ | G06Q 30/02 379/93.25 |
| 2011/0211682 A1* | 9/2011 | Singh | ...................... | H04M 1/57 379/142.05 |
| 2011/0313967 A1* | 12/2011 | Zafar | ..................... | G06Q 10/00 706/52 |
| 2014/0063175 A1* | 3/2014 | Jafry | ....................... | H04M 1/67 348/14.02 |
| 2014/0328478 A1* | 11/2014 | Chen | ..................... | H04M 3/436 379/142.06 |

(Continued)

OTHER PUBLICATIONS

"Android Developers" entry for "Intent" as accessed on Sep. 27, 2018, from https://developer.android.com/reference/android/content/intent, 400 pages.

*Primary Examiner* — William J Deane, Jr.
(74) *Attorney, Agent, or Firm* — FisherBroyles, LLP

(57) ABSTRACT

The disclosed computer-implemented method for protecting against outgoing calls to malicious phone numbers may include (1) intercepting, at a computing device, an attempt to initiate an outgoing phone call, (2) disabling, at the computing device and at least temporarily, the attempt, (3) querying a reputation server for a reputation of an outgoing phone number associated with the attempt, (4) receiving, at the computing device, reputation results from the reputation server, and (5) performing a security action comprising displaying, on a user display of the computing device and prior to enabling the attempt, at least a portion of the reputation results. Various other methods, systems, and computer-readable media are also disclosed.

21 Claims, 6 Drawing Sheets

(56) References Cited

U.S. PATENT DOCUMENTS

2015/0365514 A1* 12/2015 Li .......................... H04M 1/57
                                                          455/414.1
2018/0048759 A1*  2/2018 Sharpe ................. H04M 15/56

* cited by examiner

US 10,819,847 B1

SYSTEMS AND METHODS FOR PROTECTING AGAINST OUTGOING CALLS TO MALICIOUS PHONE NUMBERS

BACKGROUND

Attackers may use computing devices such as hacked phones to send, to unsuspecting targets, messages requesting that the targets dial malicious phone numbers, such as phone numbers of the hacked phones. In some examples, the messages from the attackers may include clickable links to initiate phone calls, BLUETOOTH connections to share applications (e.g., ANDROID application file-sharing), or other electronic connections. The unsuspecting targets may dial the malicious phone numbers mistakenly thinking the calls are benign, when instead the calls involve fraudulent activity. In some cases, the malicious phone numbers may include very expensive per-minute toll charges or per-call toll charges that are paid to the attacker. In some cases, unsuspecting users may not realize that clicking links may initiate calls to malicious phone numbers. The unsuspecting users may subsequently be defrauded out of sensitive personal data and/or money. The instant disclosure, therefore, identifies and addresses a need for systems and methods for protecting against outgoing calls to malicious phone numbers.

SUMMARY

As will be described in greater detail below, the instant disclosure describes various systems and methods for protecting against outgoing calls to malicious phone numbers.

In one example, a method for protecting against outgoing calls to malicious phone numbers may include (1) intercepting, at a computing device, an attempt to initiate an outgoing phone call, (2) disabling, at the computing device and at least temporarily, the attempt, (3) querying a reputation server for a reputation of an outgoing phone number associated with the attempt, (4) receiving, at the computing device, reputation results from the reputation server, and (5) performing a security action including displaying, on a user display of the computing device and prior to enabling the attempt, at least a portion of the reputation results. Various other methods, systems, and computer-readable media are also disclosed.

In some examples, the method may further include monitoring processor-readable instructions executing in the computing device for the attempt.

In an example, the reputation results may indicate a malicious reputation of the outgoing phone number associated with the attempt. In some examples, the reputation results may indicate a benign reputation of the outgoing phone number associated with the attempt. In some examples, the reputation results may indicate a reputation level that at least meets a threshold reputation level and further including enabling the attempt in response to the reputation level at least meeting the threshold reputation level.

In some embodiments, the method may further include displaying, on the user display, an indication the outgoing phone number associated with the attempt is on a blacklist. In an example, the method may further include displaying, on the user display, a domain of the outgoing phone number associated with the attempt.

In an example, the method may further include displaying, on the user display, a request for instructions. In an example, the instructions may include enabling the attempt to initiate the outgoing phone call. In an embodiment, the instructions may include cancelling the attempt to initiate the outgoing phone call. In an embodiment, the instructions may include blacklisting the outgoing phone number associated with the attempt. In some examples, the instructions may include whitelisting the outgoing phone number associated with the attempt. In some embodiments, the method may further include receiving an input indicating a selected instruction.

In one embodiment, a system for protecting against outgoing calls to malicious phone numbers may include at least one physical processor and physical memory that includes computer-executable instructions that, when executed by the physical processor, cause the physical processor to (1) intercept, at the system, an attempt to initiate an outgoing phone call, (2) disable, at the system and at least temporarily, the attempt, (3) query a reputation server for a reputation of an outgoing phone number associated with the attempt, (4) receive, at the system, reputation results from the reputation server, and (5) perform a security action including displaying, on a user display of the system and prior to enabling the attempt, at least a portion of the reputation results.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) intercept, at the computing device, an attempt to initiate an outgoing phone call, (2) disable, at the computing device and at least temporarily, the attempt, (3) query a reputation server for a reputation of an outgoing phone number associated with the attempt, (4) receive, at the computing device, reputation results from the reputation server, and (5) perform a security action including displaying, on a user display of the computing device and prior to enabling the attempt, at least a portion of the reputation results.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
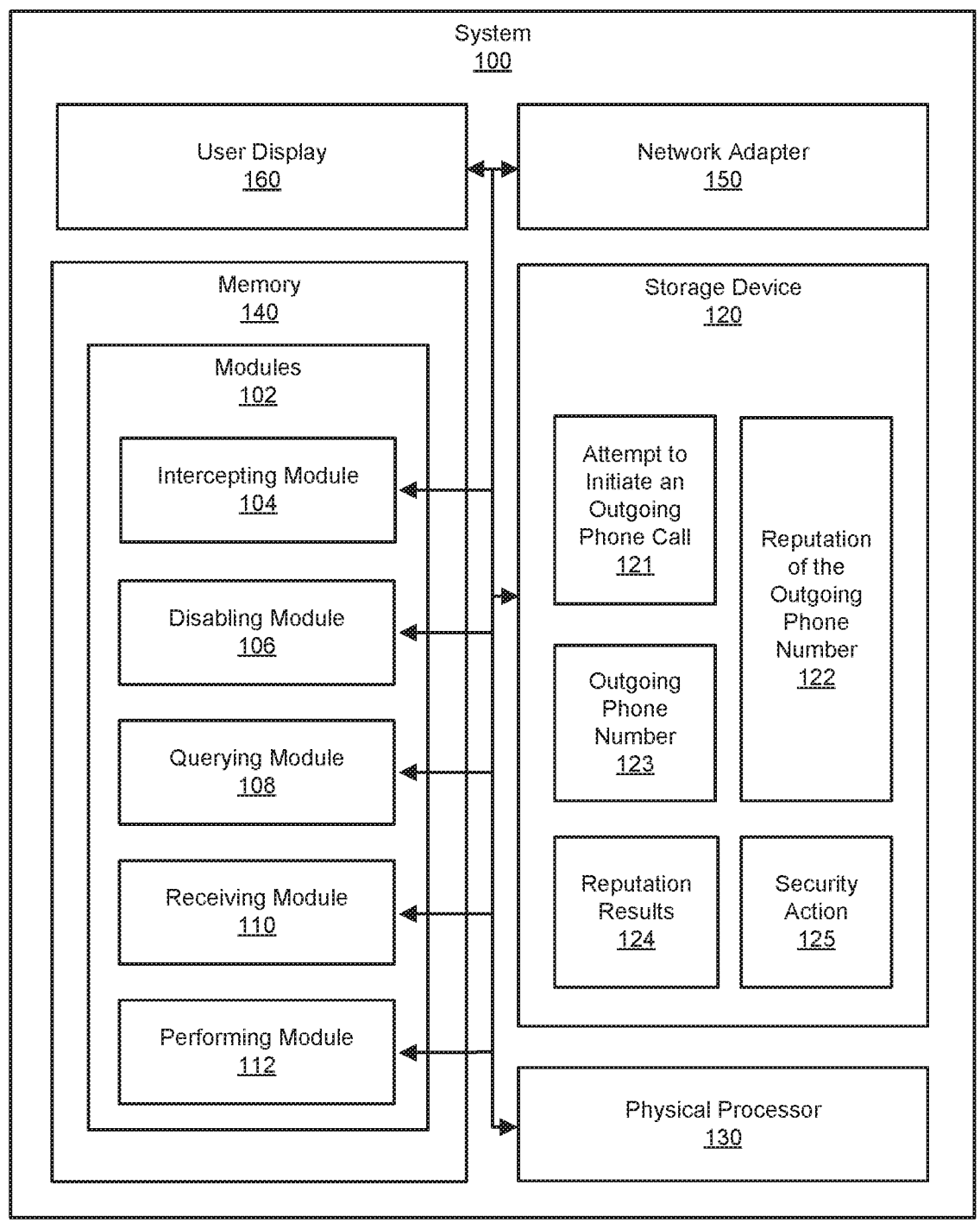
FIG. 1 is a block diagram of an example system for protecting against outgoing calls to malicious phone numbers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for protecting against outgoing calls to malicious phone numbers. As will be explained in greater detail herein, the disclosed systems and methods may automatically perform techniques that detect, classify, prevent, stop, and/or mitigate effects of electronic attempts to initiate phone calls to malicious phone numbers.

In some examples, the provided techniques may protect against outgoing calls to malicious phone numbers by intercepting electronic attempts to initiate the outgoing phone calls, disabling the attempts at least temporarily, and querying reputation servers for reputations of outgoing phone numbers associated with the attempts. The computing devices (e.g., smartphones) from which the calls are attempted may receive reputation results from the reputation servers and may perform security actions depending on, and in response to, the contents of the reputation results. The security actions may include displaying, on a user display of the computing device and prior to enabling the attempt, at least a portion of the reputation results, recommended actions, requests for instructions, the like, or a combination thereof. The security actions may also include requesting instructions as to how to proceed, such as completing the call, enabling the call, continuing to disable the call, adding the outgoing phone number to a whitelist, adding the outgoing number to a blacklist, or a combination thereof. The computing devices may receive instructions (e.g., user input) and perform actions in accordance with the received instructions.

By doing so, the systems and methods described herein may improve the overall security of computing devices. Examples of computing devices in which the provided techniques may be implemented include, and are not limited to, laptop computers, tablet computers, desktop computers, wearable computing devices (e.g., smart watches, smart glasses), smartphone devices, identify verification devices, access control devices, and/or smart televisions. In some examples, the provided techniques may advantageously thwart attempts to initiate outgoing calls to malicious phone numbers. Further, the provided techniques may advantageously inform and/or warn users about the reputations of phone numbers prior to allowing the users to call out from a phone. In some examples, the provided techniques may advantageously prevent smartphones from calling malicious phone numbers. Also, the systems and methods described herein may beneficially improve anti-malware services and/or software.

Figure 2:
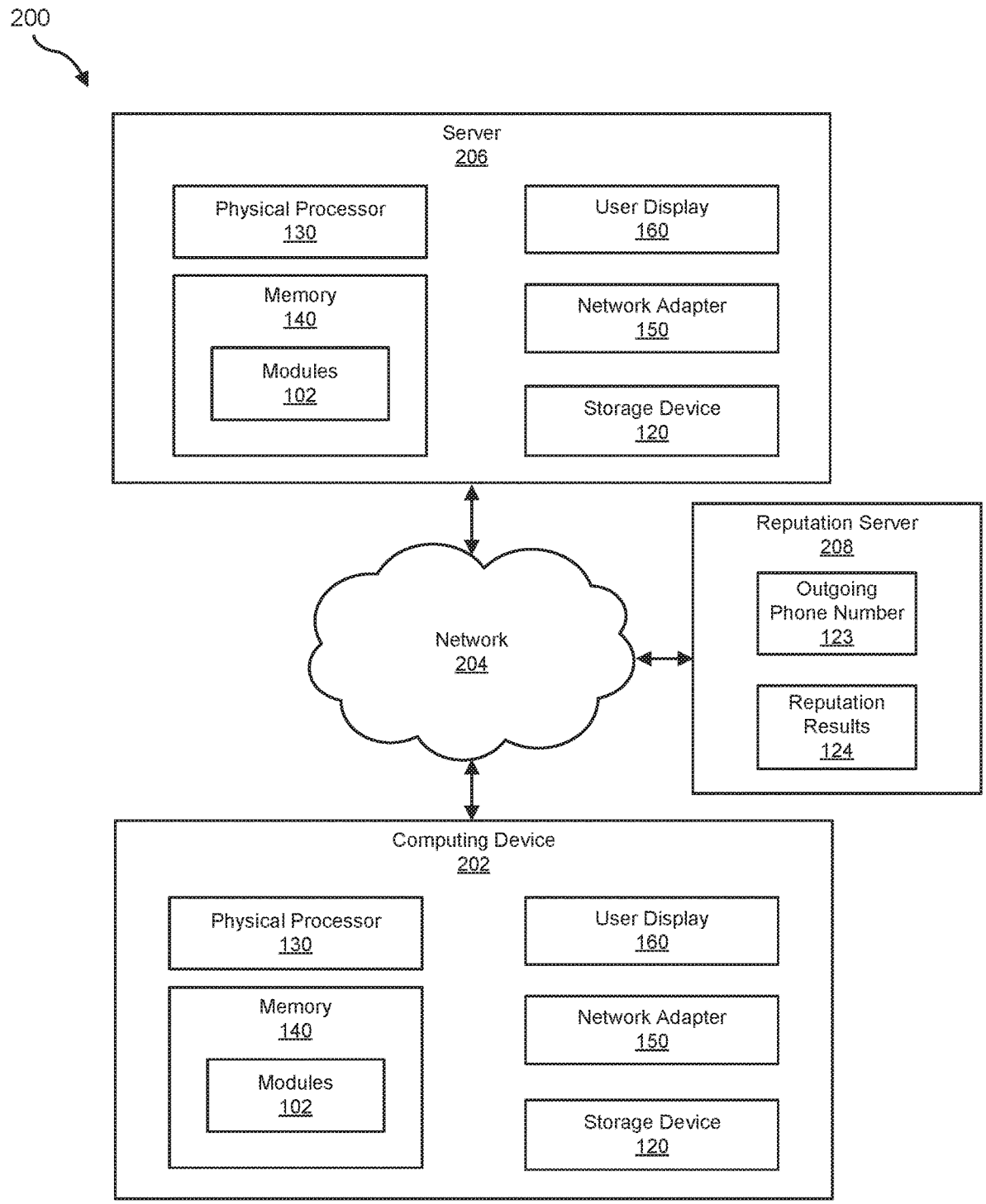
FIG. 2 is a block diagram of an additional example system for protecting against outgoing calls to malicious phone numbers.
Figure 3:
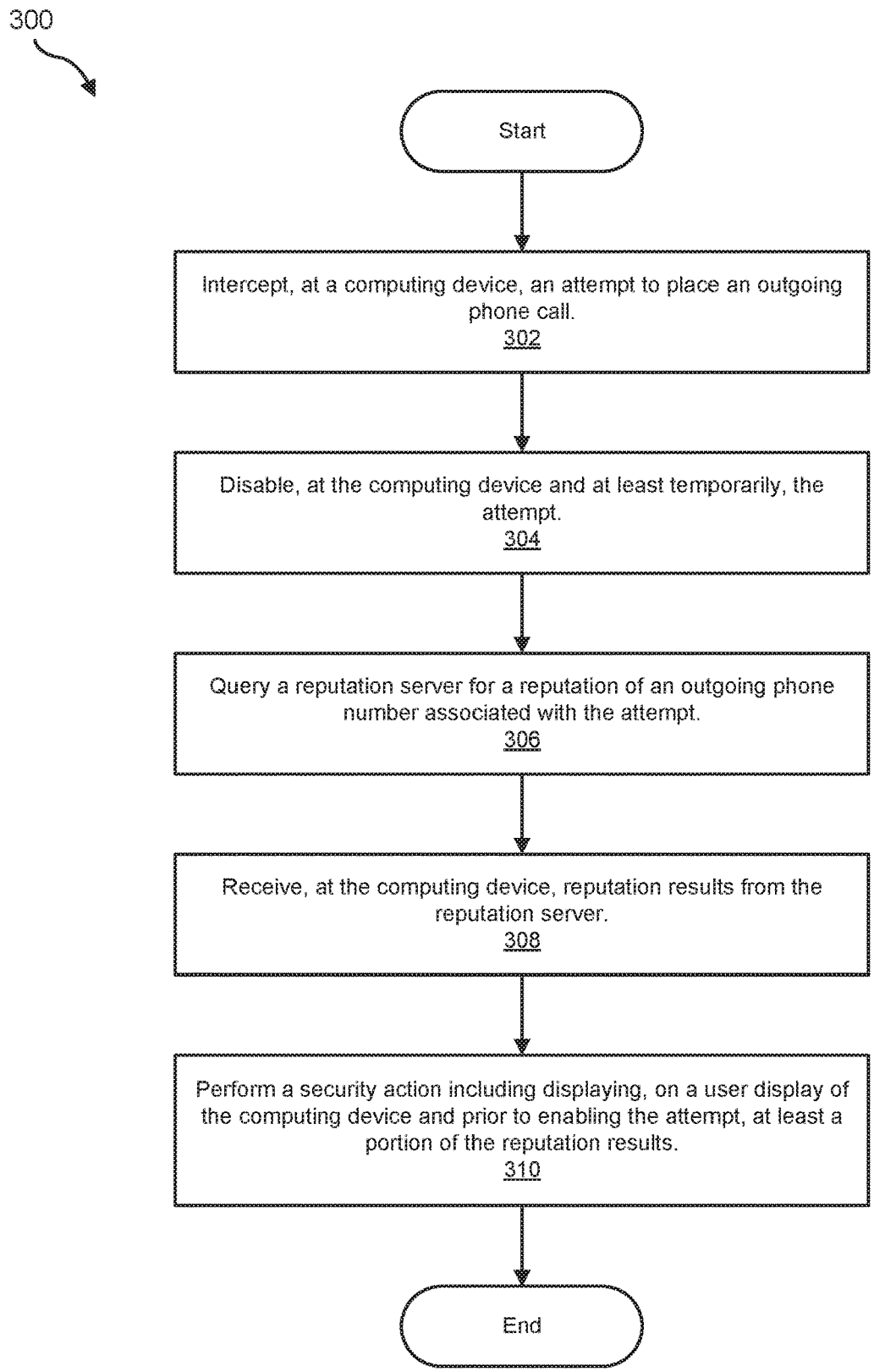
FIG. 3 is a flow diagram of an example method for protecting against outgoing calls to malicious phone numbers.
Figure 4:
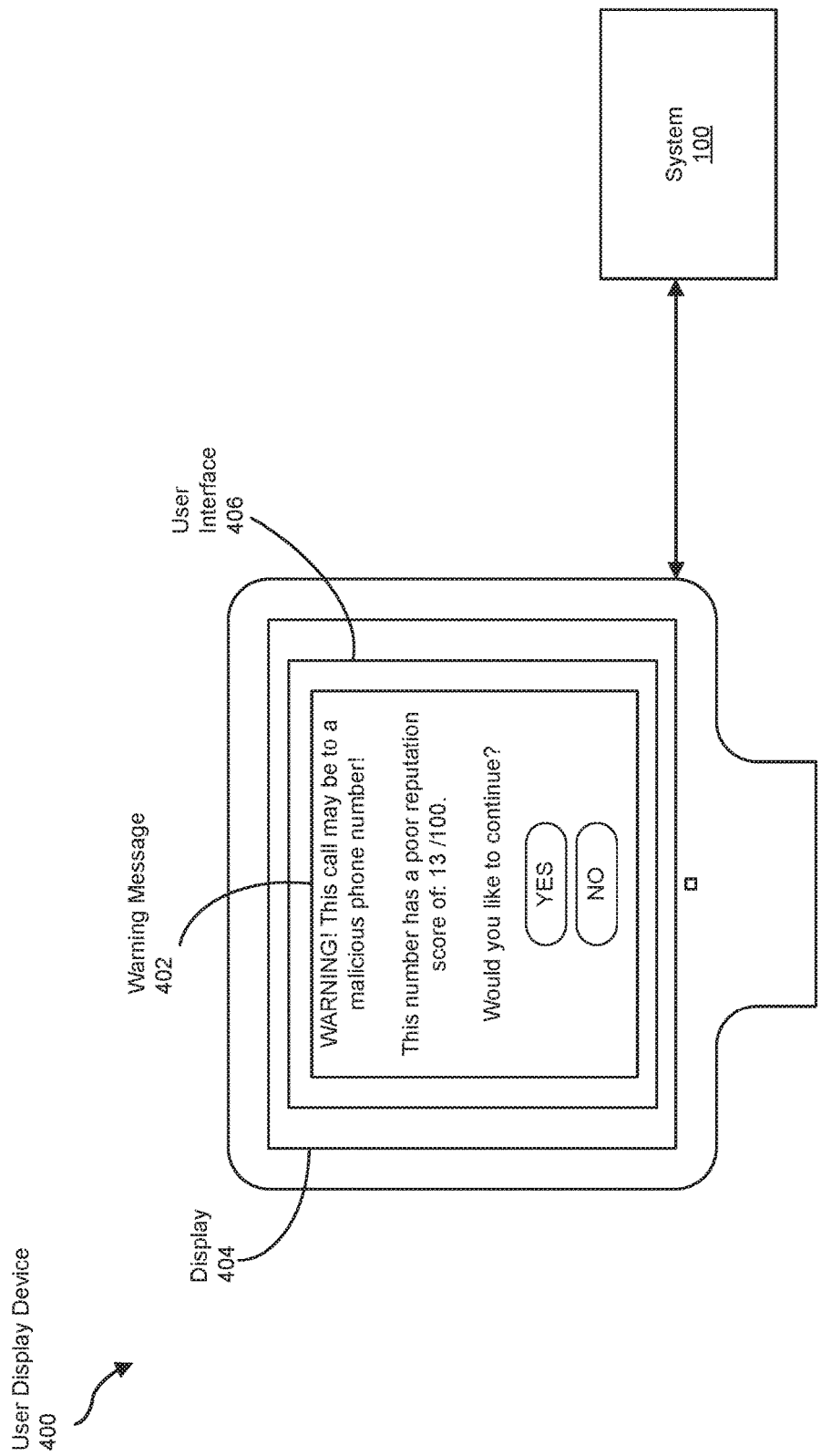
FIG. 4 is a block diagram of an example warning message on a user display device.

The following will provide, with reference to FIGS. 1-2 and 4, detailed descriptions of example systems for protecting against outgoing calls to malicious phone numbers. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for protecting against outgoing calls to malicious phone numbers. As illustrated in this figure, example system 100 may include one or more modules 102 for performing one or more tasks. As will be explained in greater detail below, modules 102 may include an intercepting module 104, a disabling module 106, a querying module 108, a receiving module 110, and/or a performing module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In some examples, storage device 120 may store, load, and/or maintain information indicating one or more attempts to initiate an outgoing phone call 121, a reputation of an outgoing phone number 122, the outgoing phone number 123 (e.g., associated with the attempt to initiate an outgoing phone call 121), reputation results 124, and/or a security action 125. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting against outgoing calls to malicious phone numbers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network adapters, such as network adapter 150. In some examples, network adapter 150 may be a physical network adapter connected to a physical network (e.g., network 204 in FIG. 2, a cellular communications network, a telephone network, the like, or a combination thereof). In some examples, network adapter 150 may be a virtual network adapter that passes packets between software components inside system 100.

Figure 5:
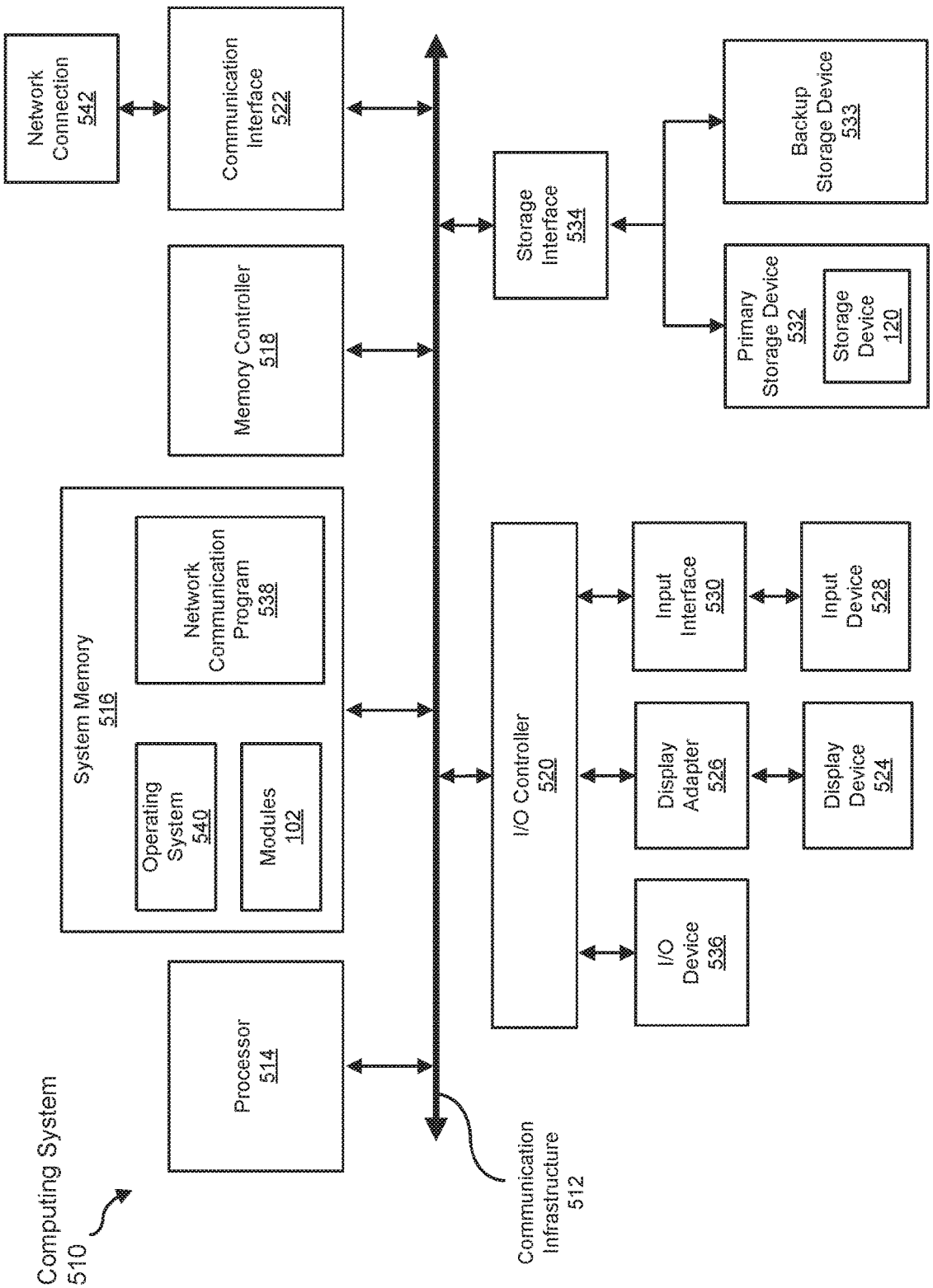
FIG. 5 is a block diagram of an example computing system capable of implementing one or more of the embodiments described and/or illustrated herein.

As illustrated in FIG. 1, example system 100 may also include one or more user display devices, such as user display 160, a touchscreen display device, display 404 in FIG. 4, display device 524 in FIG. 5, the like, or a combination thereof.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 and/or a reputation server 208 via a network 204. In one example, all or a portion of the functionality of modules 102 may be performed by computing device 202, server 206, reputation server 208, and/or any other suitable computing system. As will be described in greater detail below, one or more of modules 102 from FIG. 1 may, when executed by at least one processor of computing device 202 and/or server 206, enable computing device 202 and/or server 206 to protect against outgoing calls to malicious phone numbers. For example, and as will be described in greater detail below, one or more of modules 102 may cause computing device 202 and/or server 206 to (1) intercept, at computing device 202 and/or server 206, attempt to initiate an outgoing phone call 121, (2) disable, at computing device 202 and/or server 206 and at least temporarily, the attempt to initiate an outgoing phone call 121, (3) query a reputation server (e.g., server 206, reputation server 208, another server, the like, or a combination thereof) for reputation of the outgoing phone number 122 associated with the attempt to initiate an outgoing phone call 121, (4) receive, at computing device 202 and/or server 206, reputation results 124 from the reputation server, and (5) perform security action 125 including displaying, on user display 120 of computing device 202 and/or server 206 and prior to enabling the attempt to initiate an outgoing phone call 121, at least a portion of reputation results 124.

Computing device 202 generally represents any type or form of computing device capable of reading computer-executable instructions. In some examples, computing device 202 may represent a computer running anti-malware software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device capable of reading computer-executable instructions. In some examples, server 206 may represent a computer running anti-malware software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Server 208 generally represents any type or form of computing device capable of reading computer-executable instructions. In some examples, server 208 may represent a computer running anti-malware software. In some examples, server 208 may store outgoing phone number 123 cross-referenced to reputation results 124 in a retrievable manner. Additional examples of server 208 include, without limitation, reputation servers, security servers, application servers, web servers, storage servers, and/or database servers configured to run certain software applications and/or provide various security, web, storage, and/or database services such as providing information indicating reputations of phone numbers. Although illustrated as a single entity in FIG. 2, server 208 may include and/or represent a plurality of servers that work and/or operate in conjunction with one another.

FIG. 3 is a flow diagram of an example computer-implemented method 300 for protecting against outgoing calls to malicious phone numbers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at step 302 one or more of the systems described herein may intercept attempts to initiate outgoing phone calls. The systems described herein may perform step 302 in a variety of ways. For example, intercepting module 104 may, as part of computing device 202 and/or server 206 in FIG. 2, intercept attempt to initiate the outgoing phone call 121.

In some examples, the method may further include monitoring processor-readable instructions executing in the computing device for the attempt. In some embodiments, the method may include monitoring for system-level sharing intents such as ACTION_DIAL/ACTION_CALL intents when the monitored device is an ANDROID system-based computing device. In some examples, the method may further include monitoring inter-application communications in the computing device for the attempt. In some examples, when system-level messaging intents are identified, the method may proceed to step 304.

As illustrated in FIG. 3, at step 304 one or more of the systems described herein may disable, at least temporarily, the attempts. The systems described herein may perform step 304 in a variety of ways. For example, disabling module 106 may, as part of computing device 202 and/or server 206 in FIG. 2, disable at least temporarily attempt to initiate the outgoing phone call 121.

As illustrated in FIG. 3, at step 306 one or more of the systems described herein may query reputation servers for reputations of outgoing phone numbers associated with the attempts. The systems described herein may perform step 306 in a variety of ways. For example, querying module 108 may, as part of computing device 202 and/or server 206 in FIG. 2, query reputation server 208 for reputation of an outgoing phone number 122 associated with the attempt to initiate the outgoing phone call 121.

As illustrated in FIG. 3, at step 308 one or more of the systems described herein may receive reputation results from the reputation servers. The systems described herein may perform step 308 in a variety of ways. For example, receiving module 110 may, as part of computing device 202 and/or server 206 in FIG. 2, receive reputation results 124 from reputation server 208.

In some examples, the reputation results may indicate a malicious reputation of the outgoing phone number associated with the attempt. In some examples, the reputation results may indicate a benign reputation of the outgoing phone number associated with the attempt. In some embodiments, the reputation results may indicate crowdsourced opinions about the outgoing number. In some examples, the reputation results may indicate a numerical score, such as on a scale, a percentage, the like, or a combination thereof. In some examples, the reputation results may indicate a reputation level that at least meets a threshold reputation level and further including enabling the attempt in response to the reputation level at least meeting the threshold reputation level.

In some embodiments, the reputation results may be crowdsourced.

In some embodiments, the reputation results may describe reputations by text descriptions. In some examples, the reputation results may indicate text descriptions about the outgoing number. In some examples, the text descriptions may include "malicious," "call on blacklist" (e.g., of blacklisted numbers, of blacklisted organizations, the like, or combinations thereof), the like, or combinations thereof.

In an example, the outgoing numbers may be assigned to hacked phones that are hacked via a Signalling System 7 (i.e., SS7) attack. When the outgoing numbers are assigned to hacked phones that are hacked via SS7 attacks, reputations of the outgoing numbers may not be based on crowdsourced opinions and instead may be provided by backend services (e.g., operating on backend servers such as reputation server 208).

As illustrated in FIG. 3, at step 310 one or more of the systems described herein may perform security actions such as displaying, on user displays of computing devices and prior to enabling the attempts, at least portions of the reputation results. The systems described herein may perform step 310 in a variety of ways. For example, performing module 112 may, as part of computing device 202 and/or server 206 in FIG. 2, perform security action 125. In some examples, security action 125 may include displaying, on user display 160 of computing device 202 and/or server 206 in FIG. 2 and prior to enabling the attempt to initiate the outgoing phone call 121, at least a portion of reputation results 124.

In some examples, when reputation results indicate the reputation of the outgoing number is anything other than a threshold level (e.g., a high threshold), step 310 may be performed, otherwise the outgoing call may be enabled and placed.

In some embodiments, the security actions may further include displaying, on the user display, an indication the outgoing phone number associated with the attempt is on a blacklist. In an example, the security actions may further include displaying, on the user display, a domain of the outgoing phone number associated with the attempt. In some examples, domains may include categories such as "environmental services," "healthcare," "spam," etc.

In an example, the security actions may further include displaying, on the user display, the outgoing phone number associated with the attempt. In an example, the security actions may further include displaying, on the user display, a request for instructions. In some examples, the instructions may include enabling the attempt to initiate the outgoing phone call (e.g., by passing the call attempt to a calling application). In an embodiment, the instructions may include cancelling the attempt to initiate the outgoing phone call. In an embodiment, the instructions may include blacklisting the outgoing phone number associated with the attempt. In some examples, the instructions may include whitelisting the outgoing phone number associated with the attempt. In some embodiments, the method may further include receiving an input indicating a selected instruction.

In some embodiments, security actions may attempt to identify and/or ameliorate potential security risks posed by malicious phone numbers. In some examples, security actions may include blocking outgoing calls to malicious phone numbers, blocking actions by applications (e.g., initiating outgoing calls to malicious phone numbers), blocking access to devices (e.g., storage devices, memories, network devices, etc.), allowing limited access to devices, allowing read-only access to devices, encrypting information, deleting sharing intents (e.g., on ANDROID systems), and/or other acts limiting access to devices. In some examples, security actions may be performed automatically. In additional examples, the security actions may include displaying, on user displays (e.g., display 404 in FIG. 4, display device 524 in FIG. 5, and/or the like), warnings indicating that specific outgoing phone numbers may be at least potentially malicious phone numbers.

As detailed above, the steps outlined in method 300 in FIG. 3 may protect against outgoing calls to malicious phone numbers. By doing so, in some examples, the systems and methods described herein may advantageously thwart attempts to initiate outgoing calls to malicious phone numbers. Further, the provided techniques may advantageously inform and/or warn users about reputations of phone numbers prior to enabling calling out from a phone. In some examples, the provided techniques may advantageously prevent calling out from smartphones to malicious phone numbers. Also, the systems and methods described herein may beneficially improve anti-malware services and/or software.

In some examples, security actions may include displaying, on user displays, warnings indicating that outgoing calls may be to potentially malicious numbers. FIG. 4 depicts a non-limiting example of a user display device 400 including display 404 which may present user interface 406. In this non-limiting example, user display device 400 may display non-limiting example warning message 402 as at least a part of a security action (e.g., security action 125) in response to identifying an outgoing phone number as malicious.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, [storage device 120 may be at least a part of primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
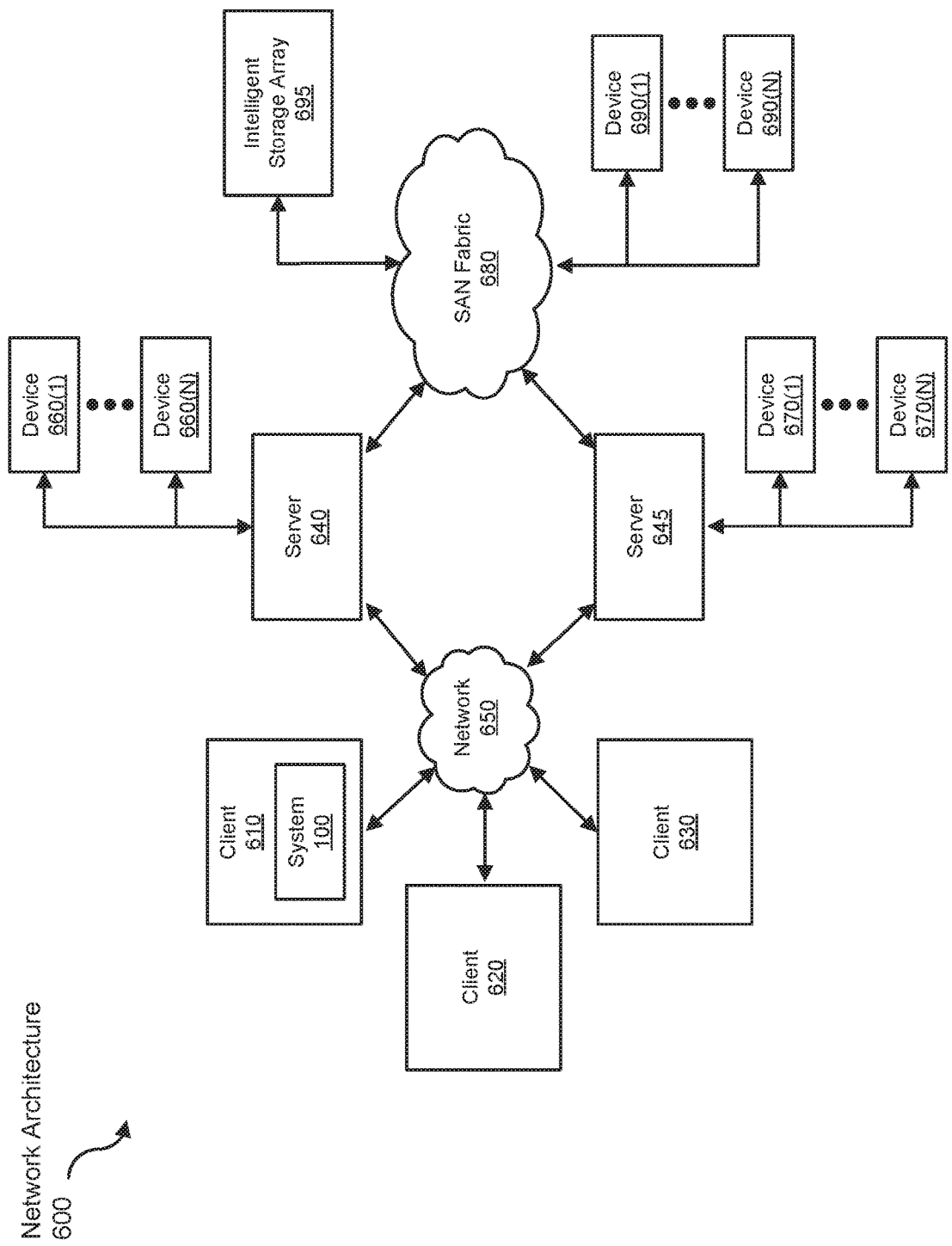
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for protecting against outgoing calls to malicious phone numbers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive outgoing call data to be transformed, transform the outgoing call data, output a result of the transformation to a user display, use the result of the transformation to initiate a security action, and store the result of the transformation to a storage device (e.g., storage device 120). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting against outgoing calls to malicious phone numbers, at least a portion of the method being performed by a computing device comprising at least one processor, the method comprising:
   intercepting, at the computing device, an attempt to initiate an outgoing phone call;
   disabling, at the computing device and at least temporarily, the attempt;
   querying a reputation server for a reputation of an outgoing phone number associated with the attempt;
   receiving, at the computing device, reputation results from the reputation server, wherein the reputation results comprise a reputation score; and
   performing a security action comprising displaying, on a user display of the computing device and prior to enabling the attempt, at least a portion of the reputation results.

2. The computer-implemented method of claim 1, further comprising monitoring processor-readable instructions executing in the computing device for the attempt.

3. The computer-implemented method of claim 1, wherein the reputation results indicate a malicious reputation of the outgoing phone number associated with the attempt.

4. The computer-implemented method of claim 1, wherein the reputation results indicate a benign reputation of the outgoing phone number associated with the attempt.

5. The computer-implemented method of claim 1, wherein the reputation results indicate a reputation level that at least meets a threshold reputation level and further comprising enabling the attempt in response to the reputation level at least meeting the threshold reputation level.

6. The computer-implemented method of claim 1, further comprising displaying, on the user display, an indication the outgoing phone number associated with the attempt is on a blacklist.

7. The computer-implemented method of claim 1, further comprising displaying, on the user display, a domain of the outgoing phone number associated with the attempt.

8. The computer-implemented method of claim 1, further comprising displaying, on the user display, a request for instructions.

9. The computer-implemented method of claim 8, wherein the instructions comprise enabling the attempt to initiate the outgoing phone call.

10. The computer-implemented method of claim 8, wherein the instructions comprise cancelling the attempt to initiate the outgoing phone call.

11. The computer-implemented method of claim 8, wherein the instructions comprise blacklisting the outgoing phone number associated with the attempt.

12. The computer-implemented method of claim 8, wherein the instructions comprise whitelisting the outgoing phone number associated with the attempt.

13. The computer-implemented method of claim 8, further comprising receiving an input indicating a selected instruction.

14. The computer-implemented method of claim 1, wherein the reputation results indicate crowdsourced opinions about the outgoing phone number.

15. A system for protecting against outgoing calls to malicious phone numbers, the system comprising:
  at least one physical processor; and
  physical memory comprising computer-executable instructions that, when executed by the physical processor, cause the physical processor to:
    intercept, at the system, an attempt to initiate an outgoing phone call;
    disable, at the system and at least temporarily, the attempt;
    query a reputation server for a reputation of an outgoing phone number associated with the attempt;
    receive, at the system, reputation results from the reputation server, wherein the reputation results comprise a reputation score; and
    perform a security action comprising displaying, on a user display of the system and prior to enabling the attempt, at least a portion of the reputation results.

16. The system of claim 15, further comprising computer-executable instructions that, when executed by the physical processor, cause the physical processor to monitor, for the attempt, other processor-readable instructions executing in the system.

17. The system of claim 15, further comprising computer-executable instructions that, when executed by the physical processor, cause the physical processor to display, on the user display, an indication the outgoing phone number associated with the attempt is on a blacklist.

18. The system of claim 15, further comprising computer-executable instructions that, when executed by the physical processor, cause the physical processor to display, on the user display, a request for instructions.

19. A non-transitory computer-readable medium comprising one or more computer-executable instructions that, when executed by at least one processor of a computing device, cause the computing device to:
  intercept, at the computing device, an attempt to initiate an outgoing phone call;
  disable, at the computing device and at least temporarily, the attempt;
  query a reputation server for a reputation of an outgoing phone number associated with the attempt;
  receive, at the computing device, reputation results from the reputation server, wherein the reputation results comprise a reputation score; and
  perform a security action comprising displaying, on a user display of the computing device and prior to enabling the attempt, at least a portion of the reputation results.

20. The non-transitory computer-readable medium of claim 19, further comprising one or more computer-executable instructions that, when executed by the at least one processor of the computing device, cause the computing device to monitor processor-readable instructions executing in the computing device for the attempt.

21. The non-transitory computer-readable medium of claim 19, further comprising one or more computer-executable instructions that, when executed by the at least one processor of the computing device, cause the computing device to display, on the user display, an indication the outgoing phone number associated with the attempt is on a blacklist.

* * * * *